Dec. 2, 1941.  G. T. HORTON  2,264,667
TANK
Filed June 17, 1938   6 Sheets-Sheet 1

Inventor:
George T. Horton,
By Chritton, Wiles, Davies, Hirsch & Dawson,
Attys.

Dec. 2, 1941.    G. T. HORTON    2,264,667
TANK
Filed June 17, 1938    6 Sheets-Sheet 2

Inventor:
George T. Horton,
By Christa, Niles, Davies, Hindel & Dawson,
Attys.

Dec. 2, 1941.  G. T. HORTON  2,264,667

TANK

Filed June 17, 1938   6 Sheets-Sheet 3

Dec. 2, 1941.    G. T. HORTON    2,264,667
TANK
Filed June 17, 1938    6 Sheets-Sheet 4

Inventor:
George T. Horton,
By Clinton, Wilds, Davies,
Hinkle & Dawson, Attys.

Dec. 2, 1941. G. T. HORTON 2,264,667
TANK
Filed June 17, 1938 6 Sheets-Sheet 6

Inventor:
George T. Horton,

Patented Dec. 2, 1941

2,264,667

UNITED STATES PATENT OFFICE 2,264,667

TANK

George T. Horton, Chicago, Ill.

Application June 17, 1938, Serial No. 214,360

3 Claims. (Cl. 220—1)

This invention relates to improvements in tanks and more especially elevated steel tanks such as frequently are employed for the storage of water.

Figure 1:
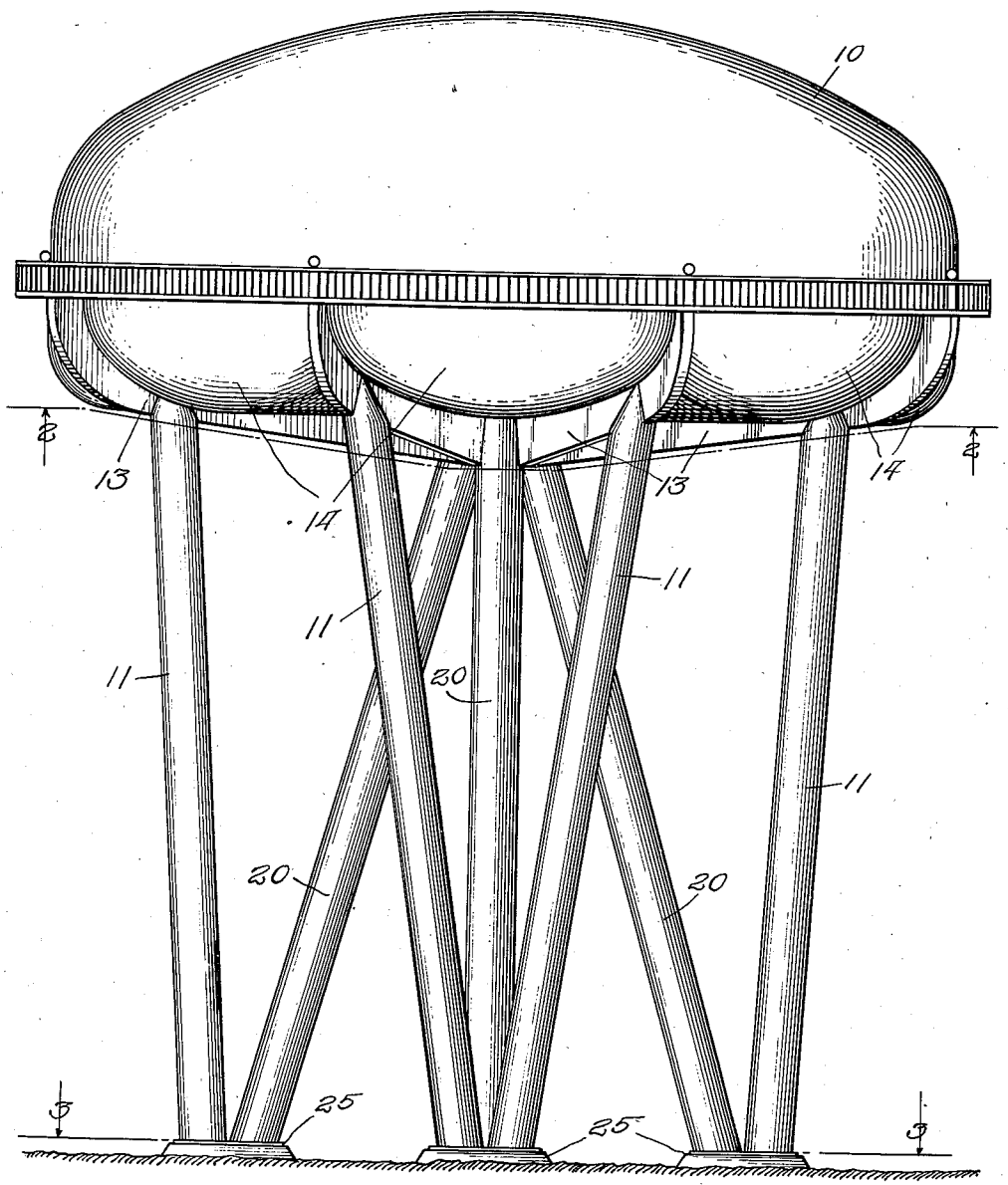
Figure 2:
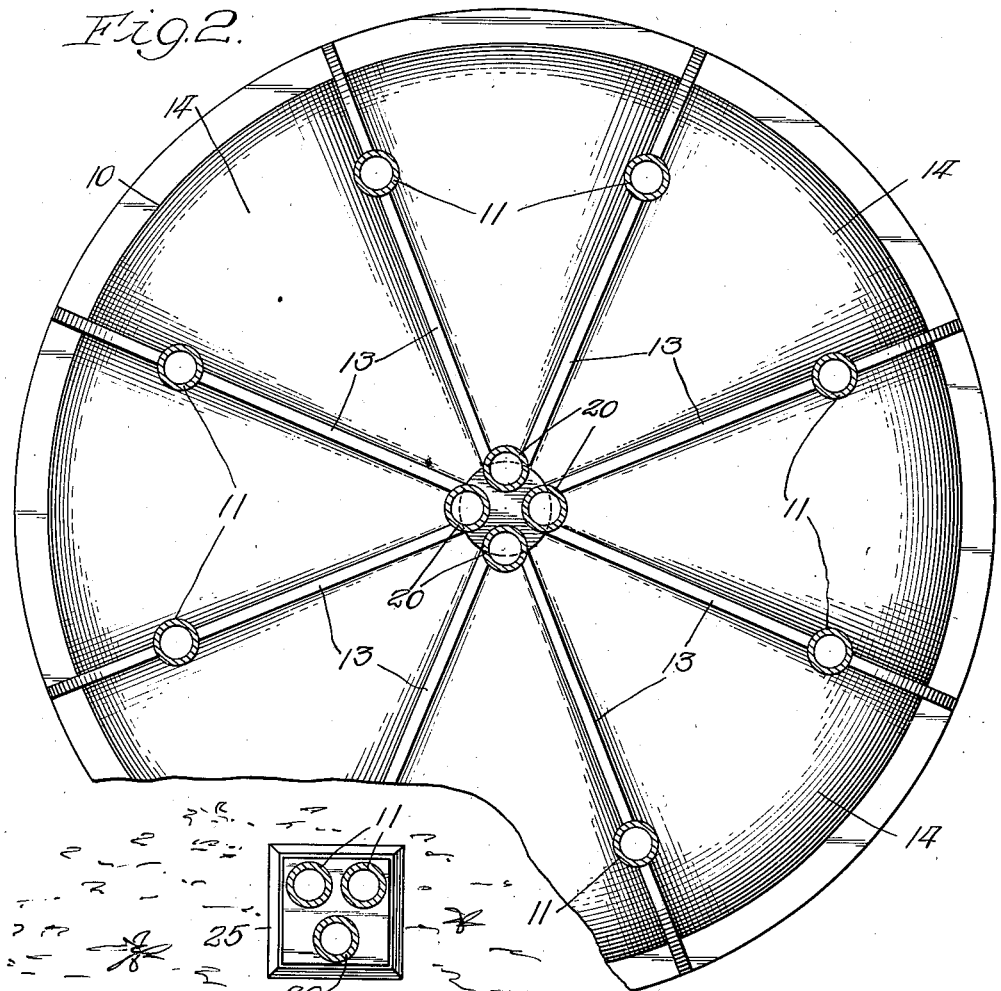

This invention constitutes an improvement on the invention shown in my earlier Patent 1,844,854 granted February 9, 1932, and more especially the structure disclosed in Figs. 1 and 2 thereof.

Among the features of my invention is the provision of an elevated tank made of sheet metal with the bottom plates convexed downwardly between the places of support to impose a tensional stress on said plates, thus permitting the use of relatively thinner plates for the bottom than if said plates were flat. In the present invention the bottom is supported by horizontal supports radially arranged. The bottom of the tank is made of sheet metal plates which are convexed downwardly between the supports so that the bottom is composed of sector-shaped plates convexed, bulged, or bowed downwardly between the radial horizontal supports to form protuberances between them.

It is to be understood that the bottom plates and the walls and top of the tank may be made of any suitable number of smaller plate sections suitably welded or otherwise fastened together as is well known in the art. Preferably small sections that can be handled are used and the same are butt welded so that the completed tank proper is one continuous piece of sheet metal.

Among the features of my invention is the provision of improved supporting means for the tank. As shown in my earlier Patent 1,844,854, the tank is supported by vertical posts 11 which carry the horizontal radial supports 13. Between the posts are shown unnumbered cross struts to brace the tank against lateral and torsional stresses. The particular feature of the present invention is the elimination of the cross struts. The bracing against torsional and lateral stresses is accomplished by making the supporting posts slanting instead of vertical. They, therefore, perform the double function of giving the requisite support to the tank to carry the main load and also serve as braces against lateral and torsional stresses.

Other features and advantages will appear more fully as I proceed with the specification.

Figure 3:
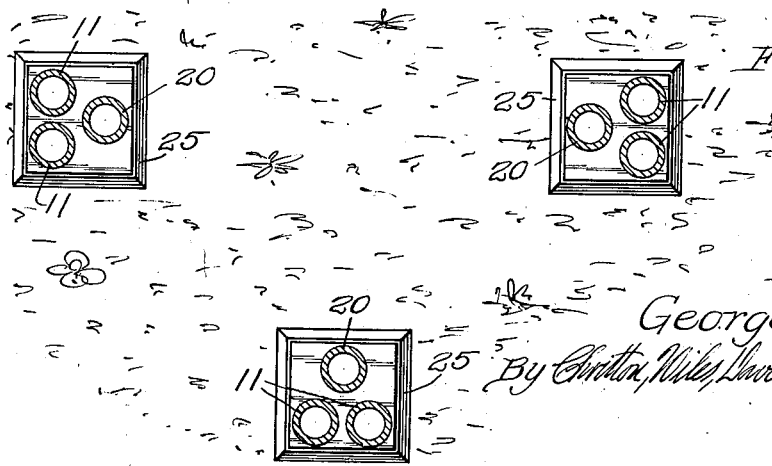
Figure 4:
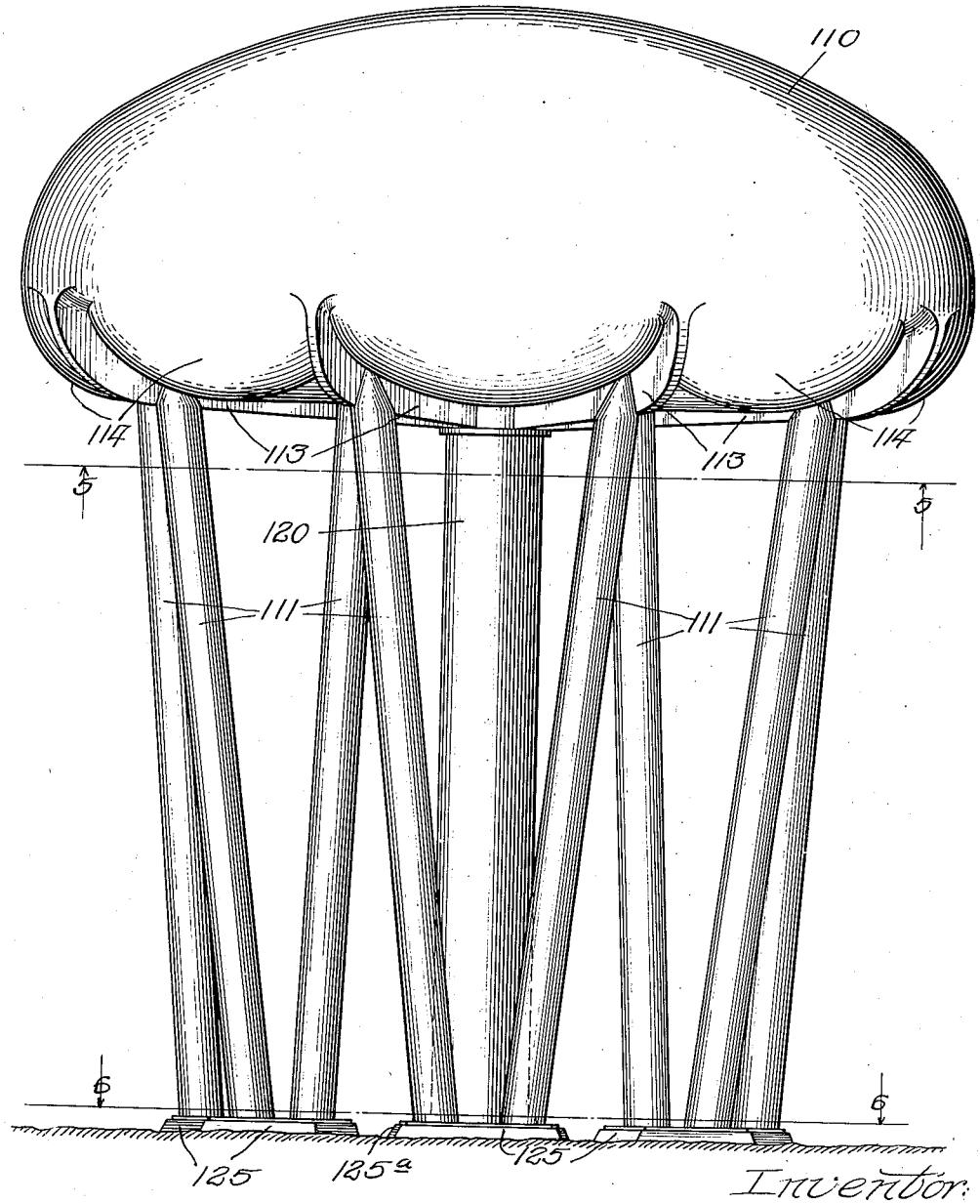
Figure 5:
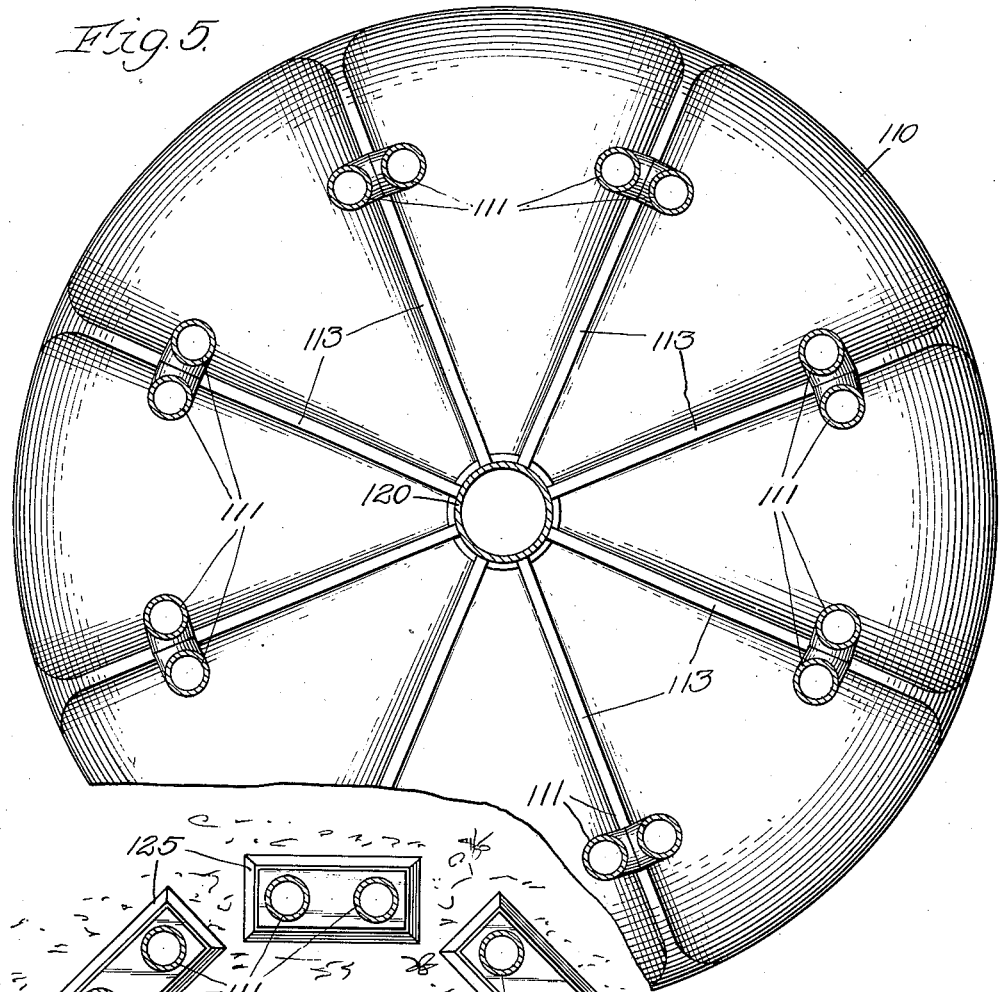
Figure 6:
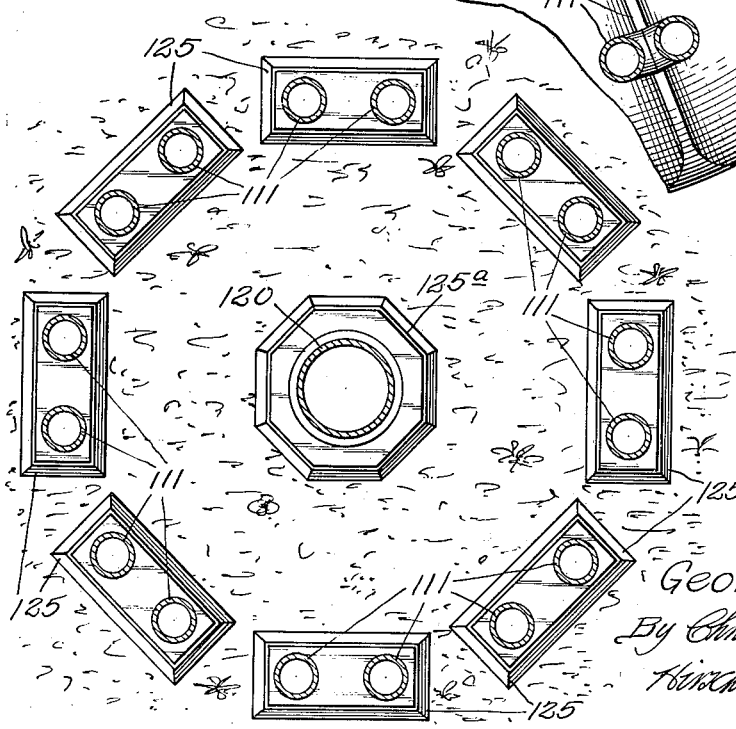
Figure 7:
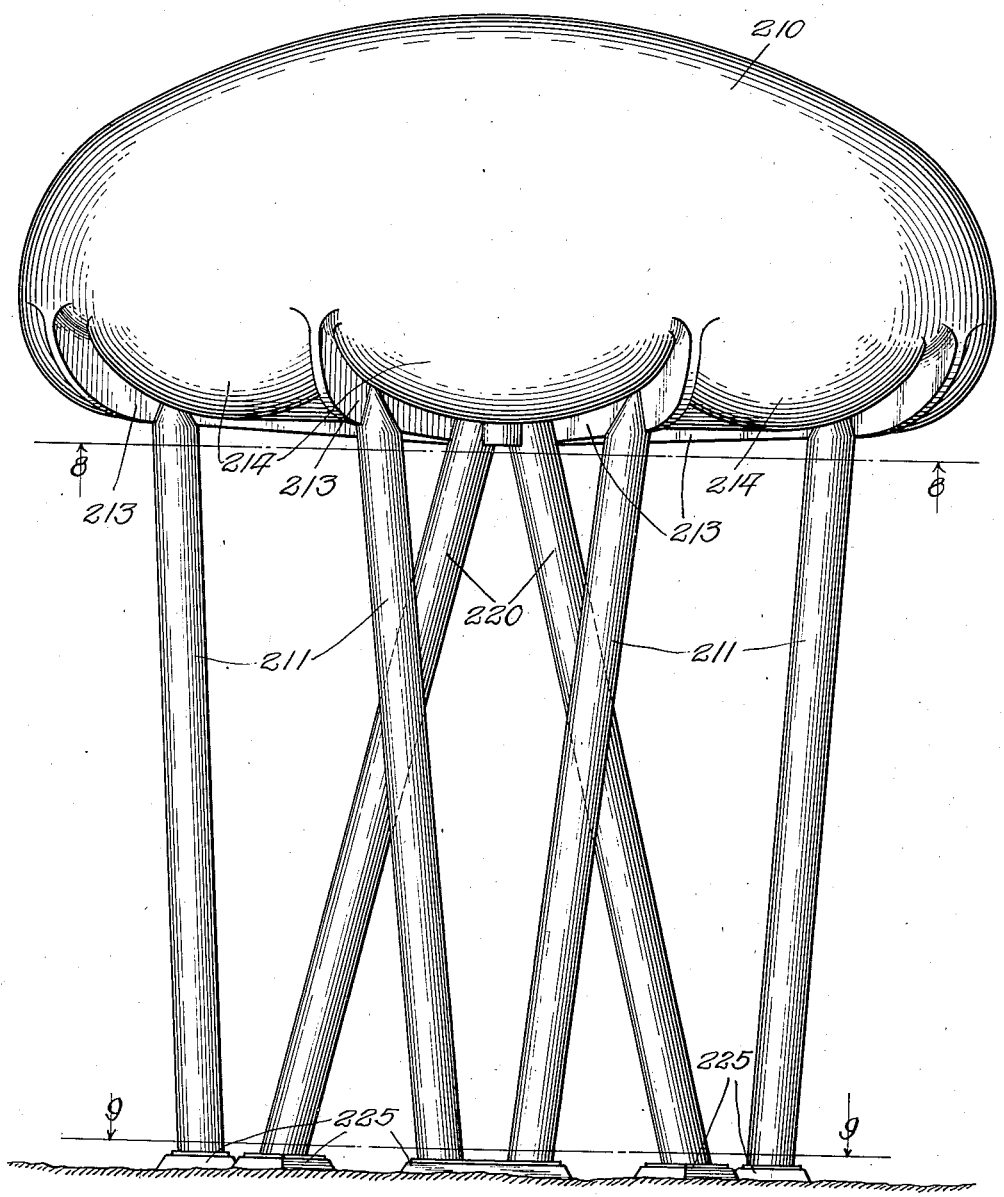
Figure 8:
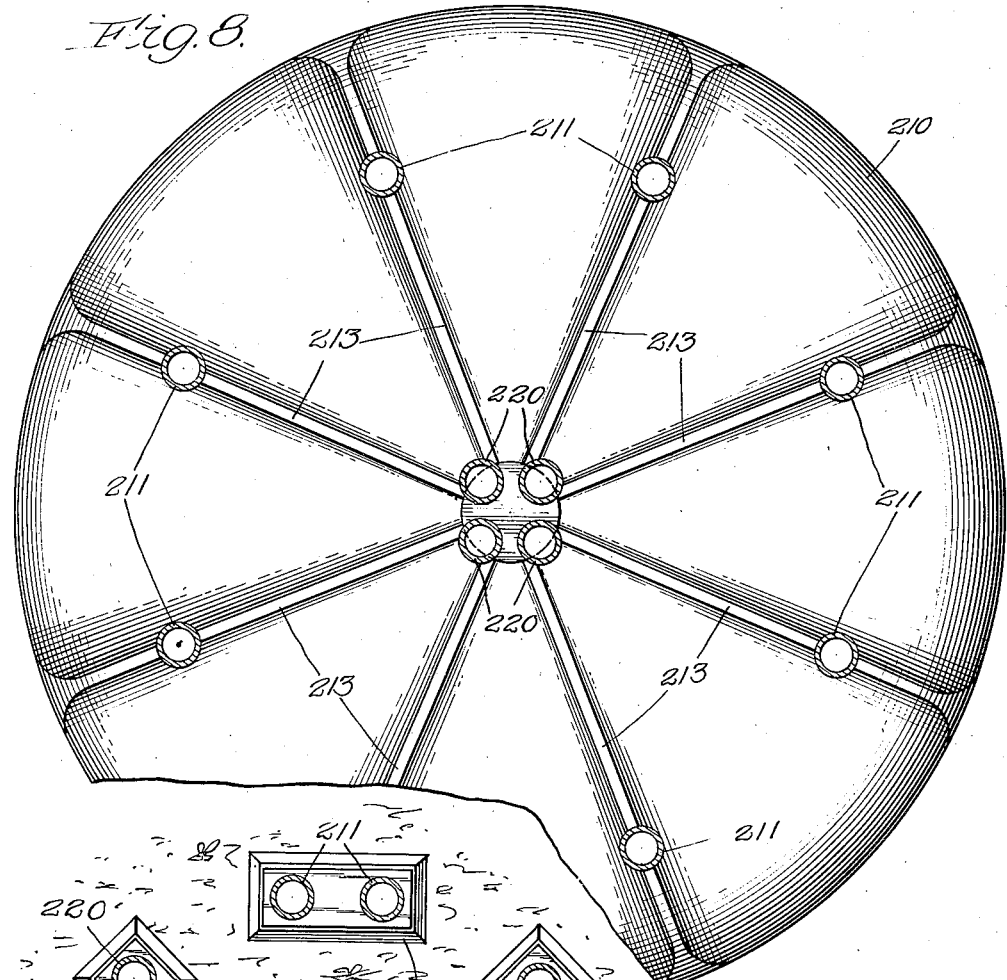
Figure 9:
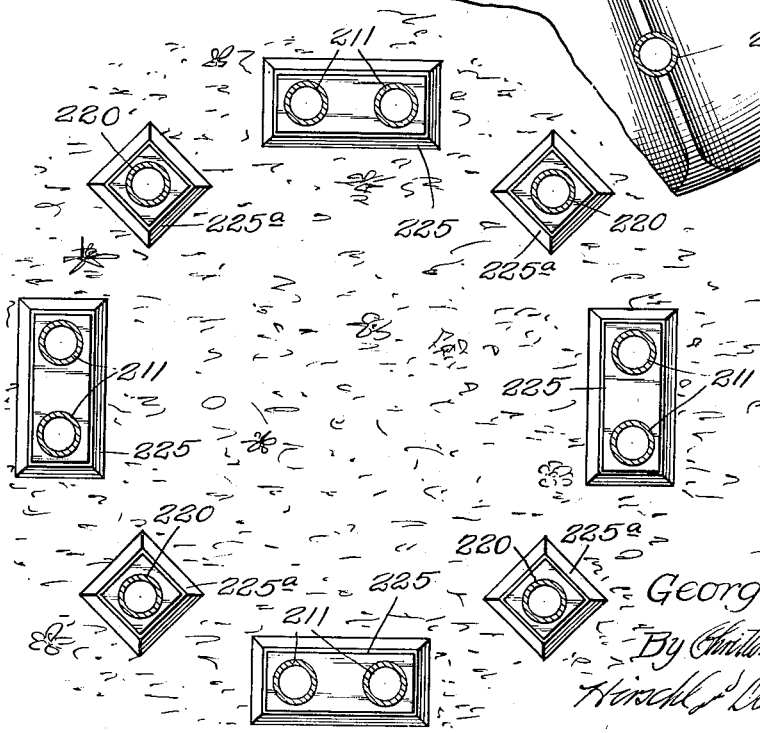

In those forms of device embodying the features of my invention shown in the accompanying drawings—Fig. 1 is a view in side elevation; Fig. 2 is a view indicated by the line 2 of Fig. 1; Fig. 3 is a view taken as indicated by the line 3 of Fig. 1; Fig. 4 is a view in side elevation of a modified form; Fig. 5 is a view taken as indicated by the line 5 of Fig. 4; Fig. 6 is a view taken as indicated by the line 6 of Fig. 4; Fig. 7 is a view in side elevation of another modified form; Fig. 8 is a view taken as indicated by the line 8 of Fig. 7; and Fig. 9 is a view taken as indicated by the line 9 of Fig. 7.

In the form shown in Figs. 1 to 3 the tank proper is indicated in general by 10 and is circular in top plan and provided with a low cylindrical side wall and a domed top. The tank proper is supported by the radially arranged horizontal supports 13. The bottom of the tank is convexed downwardly between the supports 13 as indicated by 14. The outer ends of the horizontal radial members 13 are carried by the circular posts 11 and the inner ends are carried by the circular posts 20.

Since the horizontal supporting members or ribs 13 are radially arranged, it will be seen that the outer ends thereof lie in a circle. Consequently, the upper ends of the posts 11 that support the outer ends of the members 13 also lie in a circle. The posts 11 are not vertical but are inclined downwardly circumferentially with respect to the circle in which their upper ends lie. In the construction of Fig. 1 the outer end of each member 13 is carried by a single post 11 and there are eight radial members 13. The eight supporting posts 11 are arranged in pairs, the two posts of each pair converging toward each other downwardly and circumferentially so that the two lower ends of each pair of posts 11 are supported on a common foundation or support 25.

As here shown, the posts 11 are also inclined radially upwardly and outwardly to a certain extent.

The inner ends of the horizontal ribs 13 are supported by the upper ends of the four posts 20 which diverge downwardly so that their lower ends are carried on the four supporting bases 25.

In the device shown in Figs. 4 to 6 the tank proper indicated by 110 is similar to the tank 10 above described and its bottom is supported on the eight radial horizontal members 113 resembling the members 13. Likewise, the bottom bulges downwardly between the supporting members 113 to form the bulges or protuberances 114 resembling the bulges 14 above described.

In the construction of Figs. 4 to 6 the outer ends of the radial ribs 113 are carried on the posts 111 and the inner ends are supported by the single vertical post or riser pipe 120.

In the construction of Figs. 4 to 6 the outer end of each rib 113 is carried by two posts 111 which diverge circumferentially downwardly. The divergence is sufficient so that the lower ends of adjacent posts may be supported on a single supporting base 125. Consequently there are eight of these supports 125 spaced between the outer ends of the ribs 113. The lower end of the central supporting member 120 rests on a central base 125a.

In the form of Figs. 4 to 6 also the posts 111 may preferably incline slightly outwardly and radially.

In the construction of Figs. 7 to 9 the tank proper indicated by 210 is the same as the forms above described and its bottom is likewise carried on eight radial horizontal ribs 213 and the bottom bulges downwardly between these ribs to form the protuberances 214.

In the form of Figs. 7 to 9 the outer ends of the horizontal radial members 213 are carried by the posts 211 which are substantially the same as the posts 11 described in connection with the device of Figs. 1 to 3. That is, the outer end of each rib 213 is carried by a single post 211 and the posts are arranged in pairs, the two posts of each pair converging circumferentially downwardly so that their lower ends rest on a common support 225 of which there are four in number.

In the form of Figs. 7 to 9, however, the four downwardly diverging posts 220 that carry the inner ends of the members 213 are provided with separate supporting bases 225a which are placed between the bases 225.

In the device of Figs. 7 to 9 the posts 211 are also shown as diverging radially outwardly to a slight extent.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

What I claim as new, and desire to secure by Letters Patent, is:

1. An elevated tank having a substantially flat circular sheet metal bottom supported by horizontal radial members, the sheet metal bottom being convexed downwardly between the radial members, whereby the weight of liquid in the tank will impose a tensional stress on said sheet metal bottom between said radial members, means for supporting said radial members, said means including circumferentially inclined posts supporting the outer ends of said radial members, the outer end of each radial member being supported by one post, the posts being divided into pairs with the two posts of each pair converging downwardly and circumferentially, and means for supporting the inner ends of the radial members by downwardly diverging posts with their lower ends adjacent the lower ends of the posts supporting the outer ends of the radial members.

2. An elevated tank having a substantially flat circular sheet metal bottom supported by horizontal radial members, the sheet metal bottom being convexed downwardly between the radial members, whereby the weight of liquid in the tank will impose a tensional stress on said sheet metal bottom between said radial members, means for supporting said radial members, said means including circumferentially inclined posts supporting the outer ends of said radial members, the outer end of each radial member being supported by one post, the posts being divided into pairs with the two posts of each pair converging downwardly and circumferentially, and means for supporting the inner ends of the radial members by downwardly diverging posts with their lower ends spaced between the lower ends of the posts supporting the outer ends of said radial members.

3. An elevated tank having radial members secured to the bottom thereof, and means for supporting said tank in elevated position, consisting of downwardly inclined posts, connected to the inner and outer ends of the radial members, the posts connected to the outer ends of the radial members being circumferentially inclined and arranged in pairs, each pair diverging from a group of two closely spaced points, the groups being equally spaced on a common circle and said points both lying on said circle, the posts connected to the inner ends of the radial members corresponding in number to the number of aforesaid pairs and diverging outwardly and terminating at points in a circle concentric with and having approximately the same radius as the first-mentioned circle.

GEORGE T. HORTON.